US010604815B2

(12) United States Patent
Voelker et al.

(10) Patent No.: US 10,604,815 B2
(45) Date of Patent: Mar. 31, 2020

(54) DIRECT REDUCTION PROCESS AND SHAFT FURNACE UTILIZING AN EXTENDED FLOW DIVERTER CONE

(71) Applicants: Brian Voelker, Charlotte, NC (US); Haruyasu Michishita, Charlotte, NC (US); Travis Wright, Charlotte, NC (US)

(72) Inventors: Brian Voelker, Charlotte, NC (US); Haruyasu Michishita, Charlotte, NC (US); Travis Wright, Charlotte, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 215 days.

(21) Appl. No.: 15/802,826

(22) Filed: Nov. 3, 2017

(65) Prior Publication Data

US 2018/0119237 A1   May 3, 2018

Related U.S. Application Data

(60) Provisional application No. 62/416,863, filed on Nov. 3, 2016.

(51) Int. Cl.
*C21B 13/02* (2006.01)
*C21B 7/16* (2006.01)

(52) U.S. Cl.
CPC ............. *C21B 13/02* (2013.01); *C21B 7/16* (2013.01); *C21B 13/029* (2017.05)

(58) Field of Classification Search
CPC .................................. C21B 7/16; C21B 7/20
See application file for complete search history.

(56) References Cited

U.S. PATENT DOCUMENTS 5,785,733 A    7/1998   Lee et al.
6,200,363 B1   3/2001   Whitten, Jr. et al.
(Continued)

FOREIGN PATENT DOCUMENTS

AT    387037 B    11/1998
DE    2908763 A1   9/1979

OTHER PUBLICATIONS

Feb. 20, 2018 International Search Report issued in International Patent Application No. PCT/US2017/059682.

*Primary Examiner* — Scott R Kastler
(74) *Attorney, Agent, or Firm* — Clements Bernard Walker; Christopher L. Bernard

(57) ABSTRACT

A shaft furnace for producing metallic direct reduced iron (DRI) from iron-containing pellets or lumps and reducing gas disposed therein, including: a circumferential outer wall defining a top interior reducing zone, a middle interior transition zone, and a bottom interior cooling zone, wherein the iron-containing pellets or lumps travel downwards through the top interior reducing zone, the middle interior transition zone, and the bottom interior cooling zone as the iron-containing pellets or lumps encounter the upward-flowing reducing gas and one or more other gases; and a flow diverter disposed along a centerline of the circumferential outer wall including a convex-upwards upper tapering section disposed in the middle transition zone defined by the circumferential outer wall coupled to a convex-downwards lower tapering section disposed in the bottom cooling zone defined by the circumferential outer wall.

20 Claims, 2 Drawing Sheets

(56) References Cited

U.S. PATENT DOCUMENTS

| | | |
|---|---|---|
| 8,776,844 B1 | 7/2014 | Yaegel |
| 2002/0079625 A1* | 6/2002 | Pavlicevic .............. C21B 13/02 |
| | | 266/186 |
| 2014/0091502 A1 | 4/2014 | Wright et al. |
| 2018/0119237 A1* | 5/2018 | Voelker .................... C21B 7/16 |

* cited by examiner

DIRECT REDUCTION PROCESS AND SHAFT FURNACE UTILIZING AN EXTENDED FLOW DIVERTER CONE

CROSS-REFERENCE TO RELATED APPLICATION

The present patent application/patent claims the benefit of priority of U.S. Provisional Patent Application No. 62/416,863, filed on Nov. 3, 2016, and entitled "DIRECT REDUCTION PROCESS AND SHAFT FURNACE UTILIZING AN EXTENDED FLOW DIVERTER CONE," the contents of which are incorporated in full by reference herein.

FIELD OF THE INVENTION

The present invention relates generally to a novel process and shaft furnace for the direct reduction (DR) of iron. More specifically, the present invention relates to a novel process and shaft furnace for the direct reduction of iron utilizing an extended flow diverter cone and/or other internal mechanisms that promote burden/product consistency, especially in the middle and lower portions of the shaft furnace, which provides for better production of cold direct reduced iron (CDRI), hot direct reduced iron (HDRI), and hot briquetted iron (HBI).

BACKGROUND OF THE INVENTION

There are a number of conventional processes for producing direct reduced iron (DRI) from iron ore, including the Midrex® Process (Midrex), the HYL® Process (HYL), and the PERED® Process (MME). As with all of these conventional processes, the PERED® Process converts iron oxide pellets or lumps to metallic iron by exposure to reducing gas at relatively low temperatures within a shaft furnace/reactor. The reducing gas consists of hydrogen and carbon monoxide, and is primarily produced in an external reformer, such as a catalytic reformer. The reducing gas flows upwards in the shaft furnace and is exposed to the descending iron oxide, heating it to reduction temperatures. The process can be used to produce CDRI, HDRI, and/or HBI.

Quoting MME, the most significant features the PERED® Process are:
 A continuous system utilizing an uninterrupted flow of reducing gases for the removal of oxygen from the iron oxide feed material and for carburizing the reduced iron.
 Minimum fuel consumption by recycling the top gas from the shaft furnace into the process.
 The specially designed gas reforming system which uses carbon dioxide and steam, produced during the reduction of the iron oxide, for the catalytic conversion of the natural gas without formation of soot. This obviates the necessity of an external source of oxygen for the partial oxidation of methane.
 The special feature is the control of steam percentage which is produced from the waste heat from the flue gas.
 Maximum heat recovery by preheating the main air, natural gas and feed gas, and the production of steam through flue gas.

Again, quoting MME, the equipment used in the PERED® Process includes a "novel" shaft furnace and reformer:

The shaft type metallizing furnace utilizes a continuous process flow at highest known efficiencies. Within the furnace, the pellets descend by gravity and will be metallized by direct counter current contact with reducing gasses in the reduction zone.

In the shaft furnace the iron oxide material is fed from charge hopper by gravity through a dynamic gas seal into distribution pipes, which feed the material into the reduction furnace. The oxide distribution pipes are designed specially to deliver the material on the periphery and at center, thereby maintaining a uniform profile of material in the furnace and to increase the reduction zone volume. The feed rate to the charge hopper is controlled by the discharge rate of the product from the bottom of the furnace.

The shaft furnace is divided in three zones with separate gas systems, the upper zone for reduction, a transition zone for carburizing and in-situ reforming, and the lower zone for cooling.

The reduction zone is specially designed to increase the efficiency, to eliminate fines generation, and to take care of swelling of pellets during the reduction process. The bustle ports, installed in two levels at the bottom of the reduction zone, are of special shape to have better penetration of gas to the burden and for better maintainability. The position of the top gas offtake reduces fines carry over and improves height/diameter ratio.

The reformed gas, containing hydrogen and carbon monoxide at a controlled temperature and ratio, is introduced into the descending burden through a series of ports arranged in two levels around the bottom periphery of the reduction zone. The composition and temperature of the bustle gas can be adjusted independently, if required.

Material flowing through the reduction zone passes into a transition zone prior to entering the cooling zone. This transition zone has sufficient height to isolate the reduction zone and cooling zone gas circuits from each other and to allow independent control.

The transition zone is utilized for in-situ reforming by injecting natural gas at higher and controlled flow rates.

In-situ reforming has several beneficial functions: it carburizes and cools the metallic iron and it uses sensible heat in the metallic iron to heat and reform the natural gas into additional reducing gas and thus increases productivity and overall energy consumption.

Elimination of the water-cooled burden feeder reduces fines generation, drops in burden temperature, and the chances of cluster formation in this region. In this zone there is a specially designed easy flow device called a "China hat" to regulate uniform material flow inside the furnace.

Cooling gas is introduced circumferentially through specially designed nozzles in the lower part of the shaft furnace. This modified arrangement reduces cooling zone height and improves proper distribution of the gas along the burden, which in turn improves efficiency of cooling zone.

At the top of the cooling zone, hot cooling gas is sucked through four off take channels specially designed for uniform utilization of the cooling zone and to reduce fines carryover.

The hot gas from the furnace is then scrubbed, compressed, and recycled after conditioning with NG. The process operates with very high cooling gas CH4 content to optimize the cooling zone efficiency.

The material flow at this zone is regularized by two series of burden feeders which rotate 360 degrees and can be controlled independently for speed, direction, and degree of rotation. These burden feeders are advantageous to regularize the material flow and during trouble shooting.

The reduction furnace operates at moderate pressure with the reduction gas remaining within the furnace system by means of dynamic seals at both top and bottom of the reduction furnace. The raw material entering and the product discharged through the seal legs provide a resistance to gas flow. Inert seal gas generated during firing of the reformer is introduced at elevated pressure into the seal legs. Small volumes of inert gases are vented from the reduction furnace discharge and/or the furnace charge hopper.

The DRI produced is discharged from the furnace bottom via a conveyor system into the storage bins for passivation before being consumed in the electric arc furnace (EAF) or sent to further storage for shipment.

The hot, dust laden top gas from furnace is sent to the top gas scrubber where it is cooled, cleaned, and its water vapor content reduced. Upon leaving the top gas scrubber, the gas stream is split. Approximately ⅔ of the gas is used as process gas, while the remaining ⅓ of the gas is utilized as combustion fuel to heat the reformer.

The water content is minimized from the top gas in top gas scrubber. This in turn reduces the load on process gas compressors as it has to circulate less process gas flow.

The reformer generates reduction gases by reforming natural gas in the presence of a specially designed catalyst.

The required water content for reforming is achieved by adding steam which is produced from the waste heat of the flue gas from the reformer at a controlled flow rate.

The process gas is enriched with preheated natural gas and water in the form of steam to obtain the proper feed gas mixture for reforming. After enrichment, this gas is called feed gas. The feed gas is then heated up to approximately 550° C. by waste process heat.

The preheated feed gas then flows through the reformer and is reformed in multiple heat-resisting alloy tubes containing the specially designed flower type catalysts developed to reform methane with CO2 and H2O with up to 10 ppm (vol.) Sulphur present in the feed gas.

The reformed gas analysis and the temperature of the reformer are automatically controlled. The reformer [allegedly] produces reducing gases with higher H2/CO ratio than MIDREX® reformers, which provides a safe operation of reformer and furnace. The reformed gas temperature is adjusted before entering the reduction furnace as per oxide mix ratio and oxygen availability.

The reformer is fired by multiple burners using preheated air and burning a mixture of top gas fuel recycled from furnace top gas/spent gas and natural gas. The flue gas from the reformer is used to preheat combustion air, feed gas and natural gas, and generate steam in the heat recovery system thereby minimizing the energy consumption of the DR-Plant. The flue gas is exhausted to the atmosphere by a ID fan. A small portion of the reformer flue gas is cooled and is then compressed and used as inert gas throughout the DR plant at various points.

Further, quoting MME, the alleged advantages of the PERED® Process are:

Moderate operating pressure in the reactor compared to MIDREX and HYL processes to improve the reaction rate and to keep the process simplified.

Higher H2/CO ratio to reduce the risk of clustering inside the reactor furnace and provide safer operation of reformer.

Top gas scrubber with single outlet composition with less moisture content to reduce the load of the process gas compressor.

Steam generation from waste heat recovery to reduce the energy consumption and environmental impacts.

Separate steam addition to control the H2/CO ratio precisely and thus stabilize the reduction gas quality and in turn the product quality.

Safe reformer operation with high H2/CO ratio.

Specially designed catalyst with improved efficiency to produce high quality reducing gases.

Heat recovery system of high efficiency with inverted tube bundles.

Maximum heat recovery by preheating the main air, natural gas, and feed gas and production of steam from flue gas and thus low flue gas temperature to the atmosphere.

Double bustle gas injection ports with provision for injecting reducing gases with two different compositions and temperatures.

Simplified design of bustle port to have better flow pattern and easy maintenance.

Oxide distributor feed legs specially designed for uniform distribution of oxide particle size and increase the reduction zone volume.

Ultra-thin tapered refractory construction in reactor to take care of DRI swelling.

Specially designed top gas off take to improve the efficiency of the furnace and to minimize the fines carryover.

No water-cooled burden feeders in some plants.

Specially designed rotating burden feeders, which can be controlled independently for speed, direction, and degree of rotation, to improve the flow pattern and to perform better as a cluster breaker in case of cluster formation inside the furnace.

Specially designed "China hat" for uniform material flow inside the furnace.

Circumferential cooling gas injection to optimize the cooling zone efficiency.

Specially designed cross-shaped cooling gas offtake to optimize the cooling efficiency and to minimize the fines carryover.

Less furnace height.

Less capital, operating, and maintenance cost.

What is still need in the art, however, is a DR process that improves upon the conventional "China hat" utilized in the transition zone of the shaft furnace to promote burden/product consistency. This structure typically includes a simple, fixed, upwards-pointing convex flow interrupter or the like over and around which the pellets/lumps flow in the transition zone, theoretically to break up any clumps that form and ensure adequate and uniform mixing and gas distribution.

BRIEF SUMMARY OF THE INVENTION

In various exemplary embodiments, the present invention replaces the transition zone "China hat" of conventional DR processes with an improved extended flow diverter cone. This extended flow diverter cone is disposed on a shaft that traverses the width of the transition/cooling zone of the shaft furnace. Optionally, the shaft allows the extended flow diverter cone to pivot to a degree within the shaft furnace. The extended flow diverter cone includes a first relatively shorter upwards-pointing cone portion in the transition zone within the shaft furnace coupled to a second relatively longer downwards-pointing cone portion in the cooling zone within the shaft furnace. Each of these cone portions may utilize one or more circumferential slopes. The shaft and/or cone portions may optionally include one or more gas injection ports enabling reducing gas, transition zone gas, and/or cooling gas to be introduced near the center of the transition/cooling zone, allowing for better saturation, and may be followed in sequence by additional similar gas injection ports. Conventional burden feeders may be disposed above and/or below the extended flow diverter cone, including upper burden feeders, middle burden feeders, and lower burden feeders, all of which help keep the burden moving uniformly through the shaft furnace. In general, the dual-cone flow diverter of the present invention improves all shaft furnace metrics, especially in "hot" applications.

Optionally, the lower cone covers 30-40% of the length of the cooling zone, although other percentages may be utilized, provided that the lower cone covers a substantial portion of the length (and volume) of the cooling zone. The dual-cone configuration serves to promote uniformity and avoid clumping in both the transition zone and the cooling zone within the shaft furnace. Again, one or both cones may have one or multiple sections or angles. The extended flow diverter cone is preferably suspended within the shaft furnace by the shaft, which is disposed proximate the border between the transition zone and the cooling zone, the shaft engaging the extended flow diverter cone near its transition from the first cone to the second cone.

Optionally, the bottom portion of the lower cone includes an aperture that is selectively closed via a cover. This serves to prevent debris that may collect within the dual cone from inadvertently becoming dislodged and dropping in a hazardous manner. The cone(s) may be lined with refractory and/or water cooled, as desired.

In one exemplary embodiment, the present invention provides a shaft furnace for producing metallic direct reduced iron (DRI) from iron-containing pellets or lumps and reducing gas disposed therein, comprising: a circumferential outer wall defining a top interior reducing zone, a middle interior transition zone, and a bottom interior cooling zone, wherein the iron-containing pellets or lumps travel downwards through the top interior reducing zone, the middle interior transition zone, and the bottom interior cooling zone as the iron-containing pellets or lumps encounter the upward-flowing reducing gas and one or more other gases; and a flow diverter disposed along a centerline of the circumferential outer wall comprising a convex-upwards upper tapering section disposed in the middle transition zone defined by the circumferential outer wall coupled to a convex-downwards lower tapering section disposed in the bottom cooling zone defined by the circumferential outer wall. The flow diverter is coupled to a shaft disposed across an interior diameter of the circumferential outer wall. Optionally, the shaft permits the flow diverter to pivot within the interior of the circumferential outer wall. Optionally, the shaft is disposed across the interior diameter of the circumferential outer wall coincident with a boundary between the middle interior transition zone defined by the circumferential outer wall and the bottom interior cooling zone defined by the circumferential outer wall. Optionally, each of the tapering sections of the flow diverter comprises a plurality of segments each having a different taper angle. Optionally, the shaft furnace further comprises one or more gas ports disposed on one or more of the shaft and the flow diverter configured to communicate a gas into the iron-containing pellets or lumps disposed within the interior of the circumferential outer wall. Optionally, the shaft furnace further comprises one or more gas ports disposed through the circumferential outer wall below the flow diverter configured to communicate a gas into the iron-containing pellets or lumps disposed within the interior of the circumferential outer wall. Optionally, the shaft furnace further comprises one or more burden feeders disposed within the circumferential outer wall one or more of above and below the flow diverter. Optionally, the shaft furnace further comprise a cooling line running through an interior of one or more of the shaft and the flow diverter. Preferably, the lower tapering section of the flow diverter disposed in the bottom cooling zone defined by the circumferential outer wall covers 30% or more of the vertical length of the bottom cooling zone defined by the circumferential outer wall.

In another exemplary embodiment, the present invention provides a method for producing metallic direct reduced iron (DRI) from iron-containing pellets or lumps and reducing gas disposed in a shaft furnace, comprising: providing a circumferential outer wall defining a top interior reducing zone, a middle interior transition zone, and a bottom interior cooling zone, wherein the iron-containing pellets or lumps travel downwards through the top interior reducing zone, the middle interior transition zone, and the bottom interior cooling zone as the iron-containing pellets or lumps encounter the upward-flowing reducing gas and one or more other gases; and providing a flow diverter disposed along a centerline of the circumferential outer wall comprising a convex-upwards upper tapering section disposed in the middle transition zone defined by the circumferential outer wall coupled to a convex-downwards lower tapering section disposed in the bottom cooling zone defined by the circumferential outer wall. The flow diverter is coupled to a shaft disposed across an interior diameter of the circumferential outer wall. Optionally, the shaft permits the flow diverter to pivot within the interior of the circumferential outer wall. Optionally, the shaft is disposed across the interior diameter of the circumferential outer wall coincident with a boundary between the middle interior transition zone defined by the circumferential outer wall and the bottom interior cooling zone defined by the circumferential outer wall. Optionally, each of the tapering sections of the flow diverter comprises a plurality of segments each having a different taper angle. Optionally, the method further comprises providing one or more gas ports disposed on one or more of the shaft and the flow diverter configured to communicate a gas into the iron-containing pellets or lumps disposed within the interior of the circumferential outer wall. Optionally, the method further comprises providing one or more gas ports disposed through the circumferential outer wall below the flow diverter configured to communicate a gas into the iron-containing pellets or lumps disposed within the interior of the circumferential outer wall. Optionally, the method further comprises providing one or more burden feeders disposed within the circumferential outer wall one or more of above and below the flow diverter. Optionally, the method further comprises providing a cooling line running through an interior of one or more of the shaft and the flow diverter. Preferably, the lower tapering section of the flow diverter disposed in the bottom cooling zone defined by the circumferential outer wall covers 30% or more of the vertical length of the bottom cooling zone defined by the circumferential outer wall.

BRIEF DESCRIPTION OF THE DRAWINGS

The present invention is illustrated and described herein with reference to the various drawings, in which like reference numbers are used to denote like assembly components/method steps, as appropriate, and in which.

DETAILED DESCRIPTION OF THE INVENTION

Figure 1:
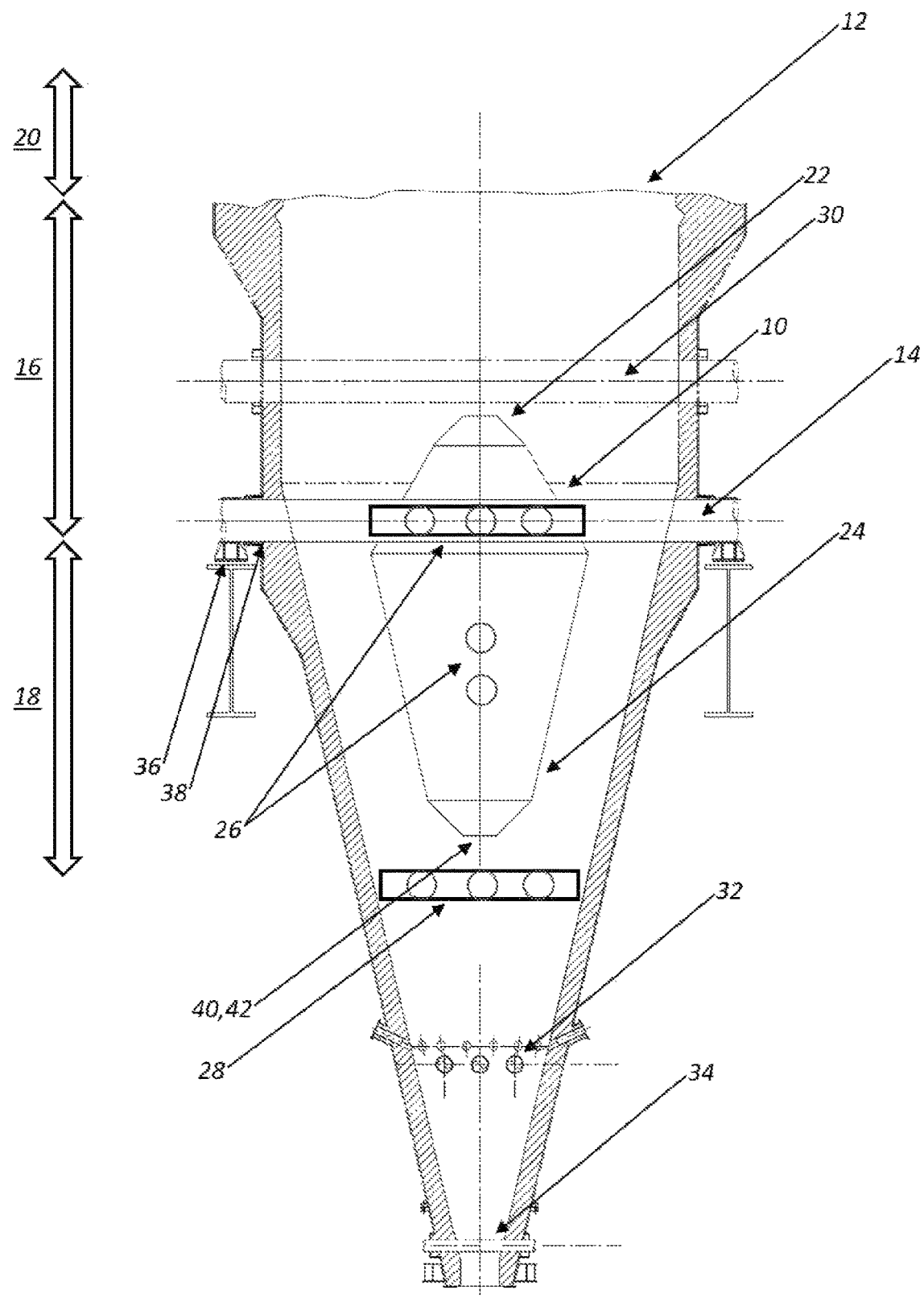
FIG. 1 is a schematic diagram illustrating one exemplary embodiment of the DR shaft furnace of the present invention, the shaft furnace utilizing a novel extended flow diverter cone in the transition zone and the cooling zone.
Figure 2:
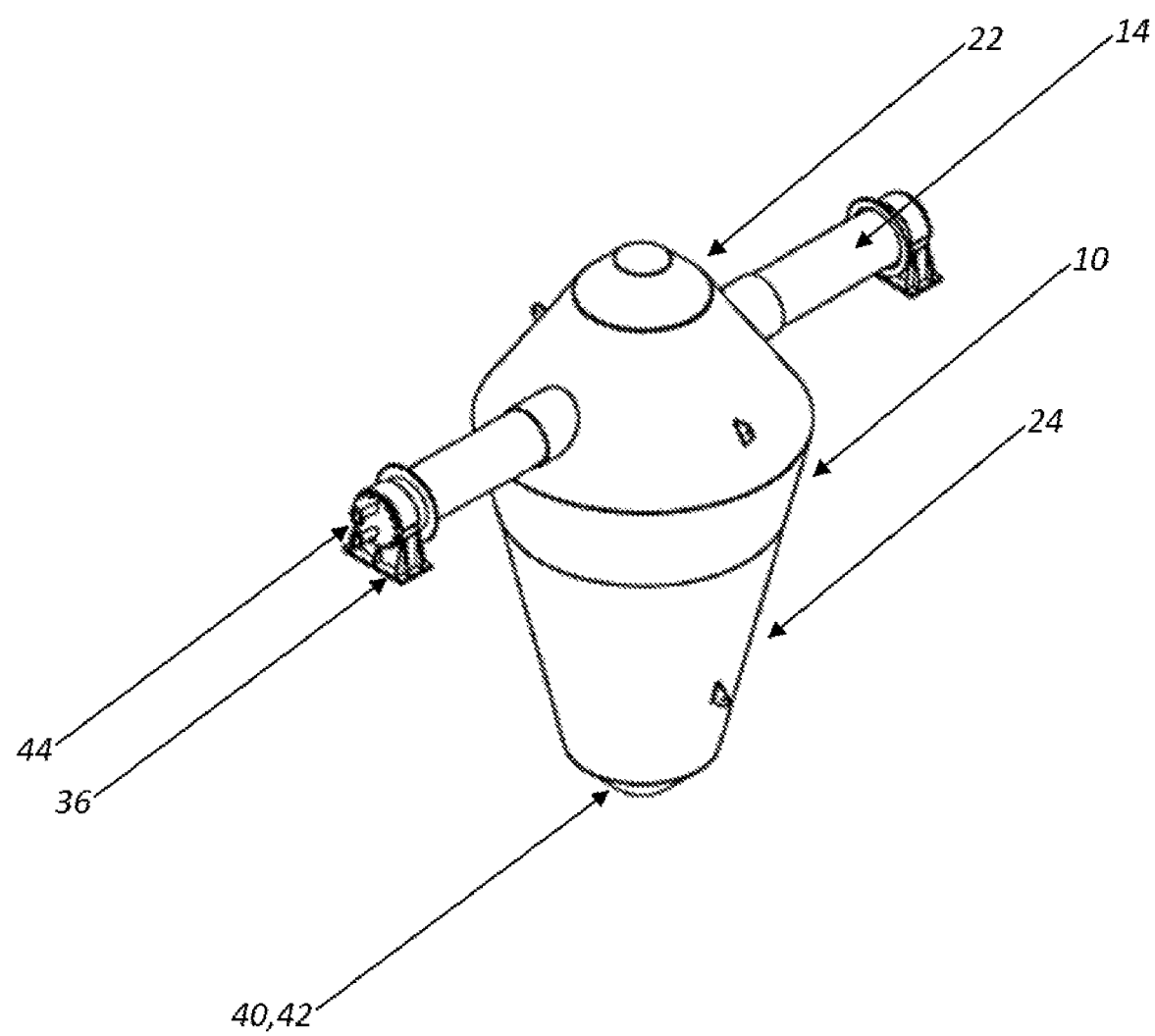
FIG. 2 is a schematic diagram illustrating one exemplary embodiment of the extended flow diverter cone of the present invention.

Referring now specifically to FIGS. 1 and 2, in one exemplary embodiment, the present invention replaces the transition zone "China hat" of conventional DR processes with an improved extended flow diverter cone 10 disposed in the shaft furnace 12. This extended flow diverter cone 10 is disposed on a shaft 14 that traverses the width of the transition zone 16 and cooling zone 18 of the shaft furnace 12, below the reducing zone 20. As is understood by those of ordinary skill in the art, within the shaft furnace 12, the reducing zone 20 represents the solid reactor where sponge iron is produced from the iron ore pellets by exposure to the reducing gas and the transition zone 16, located just below the reducing zone 20, has sufficient height to thermally isolate the reducing zone 20 from the bottom cooling zone 18, where the solid product is reduced in temperature down to around 50° C., for example. Typically, the cooling cone 18 corresponds to the tapering, narrowing lower portion of the shaft furnace 12, as illustrated.

Optionally, the shaft 14 allows the extended flow diverter cone 10 to pivot to a degree within the shaft furnace 12. The extended flow diverter cone 10 includes a first (upper) relatively shorter upwards-pointing cone portion 22 disposed in the transition zone 16 within the shaft furnace 12 coupled to a second (lower) relatively longer downwards-pointing cone portion 24 disposed in the cooling zone 18 within the shaft furnace. Each of these cone portions 22 and 24 may utilize one or more circumferential slopes.

The shaft 14 and/or cone portions 22 and 24 may optionally include one or more gas injection ports 26 enabling reducing gas, transition zone gas, and/or cooling gas to be introduced near the centerline of the shaft furnace 12, allowing for better gas saturation, and may be followed in sequence by additional similar gas injection ports 28. The gas(es) that me be delivered to the burden via these gas injection ports 26 and/or 28 include reducing gas, natural gas, coke over gas, oxygen, and/or cooling gas, for example.

Conventional burden feeders 30, 32, and 34 may be disposed above and/or below the extended flow diverter cone 10, including upper burden feeders 30 above the extended flow diverter cone 10, middle burden feeders 32 below the extended flow diverter cone 10, and lower burden feeders 34 below the middle burden feeders 32, all of which help keep the burden moving uniformly through the shaft furnace 12 and about the extended flow diverter cone 10. In general, the dual-cone flow diverter 10 of the present invention improves all shaft furnace metrics, especially in "hot" applications.

Optionally, the lower cone 24 covers 30-40% of the length of the cooling zone 18 of the shaft furnace 12, although other percentages may be utilized, provided that the lower cone 24 covers a substantial portion of the length (and volume) of the cooling zone 18. The dual-cone configuration serves to promote uniformity and avoid clumping in both the transition zone 16 and the cooling zone 18 within the shaft furnace 12. Again, one or both cones 22 and/or 24 may have one or multiple sections or angles, including primary portions and terminating portions, for example. The extended flow diverter cone 10 is preferably suspended within the shaft furnace 12 by the shaft 14, which is disposed proximate the border between the transition zone 16 and the cooling zone 18, the shaft 14 engaging the extended flow diverter cone 10 near its transition from the first cone 22 to the second cone 24. In this exemplary embodiment, the shaft 14 sits on/in one or more bearings/fittings 36 disposed external to the shaft furnace 12 and protrudes through opposed ports 38 manufactured into the sides of the shaft furnace 12.

Optionally, the bottom portion of the lower cone 24 includes an aperture 40 that is selectively closed via a cover 42. This serves to prevent debris that may collect within the dual cone 10 from inadvertently becoming dislodged and dropping in a hazardous manner. The shaft 14 and/or cone(s) 22 and 24 may be lined with refractory and/or water cooled via one or more internal cooling lines 44, as desired.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A shaft furnace for producing metallic direct reduced iron (DRI) from iron-containing pellets or lumps and reducing gas disposed therein, comprising:

a circumferential outer wall defining a top interior reducing zone, a middle interior transition zone, and a bottom interior cooling zone, wherein the iron-containing pellets or lumps travel downwards through the top interior reducing zone, the middle interior transition zone, and the bottom interior cooling zone as the iron-containing pellets or lumps encounter the upward-flowing reducing gas and one or more other gases, wherein the top interior reducing zone is an area above bustle ports of the shaft furnace adapted to contain the iron-containing pellets or lumps during reduction, the bottom interior cooling zone is an area below a cooling gas offtake of the shaft furnace adapted to contain the iron-containing pellets or lumps after reduction during cooling, and the middle interior transition zone is an area between the bustle ports and the cooling gas offtake adapted to thermally isolate the bottom interior cooling zone from the top interior reducing zone; and a flow diverter disposed along a centerline of the circumferential outer wall comprising a convex-upwards upper tapering section disposed in the middle transition zone below the top reducing zone defined by the circumferential outer wall coupled to a convex-downwards lower tapering section disposed in the bottom cooling zone defined by the circumferential outer wall.

2. The shaft furnace of claim 1, wherein the flow diverter is coupled to a shaft disposed across an interior diameter of the circumferential outer wall.

3. The shaft furnace of claim 2, wherein the shaft permits the flow diverter to pivot within the interior of the circumferential outer wall.

4. The shaft furnace of claim 2, wherein the shaft is disposed across the interior diameter of the circumferential outer wall coincident with a boundary between the middle interior transition zone defined by the circumferential outer wall and the bottom interior cooling zone defined by the circumferential outer wall.

5. The shaft furnace of claim 1, wherein each of the tapering sections of the flow diverter comprises a plurality of segments each having a different taper angle.

6. The shaft furnace of claim 1, further comprising one or more gas ports disposed on one or more of the shaft and the flow diverter configured to communicate a gas into the iron-containing pellets or lumps disposed within the interior of the circumferential outer wall.

7. The shaft furnace of claim 1, further comprising one or more gas ports disposed through the circumferential outer wall below the flow diverter configured to communicate a gas into the iron-containing pellets or lumps disposed within the interior of the circumferential outer wall.

8. The shaft furnace of claim 1, further comprising one or more burden feeders disposed within the circumferential outer wall one or more of above and below the flow diverter.

9. The shaft furnace of claim 2, further comprising a cooling line running through an interior of one or more of the shaft and the flow diverter.

10. The shaft furnace of claim 1, wherein the lower tapering section of the flow diverter disposed in the bottom cooling zone defined by the circumferential outer wall covers 30% or more of the vertical length of the bottom cooling zone defined by the circumferential outer wall.

11. A method for producing metallic direct reduced iron (DRI) from iron-containing pellets or lumps and reducing gas disposed in a shaft furnace, comprising:

providing a circumferential outer wall defining a top interior reducing zone, a middle interior transition zone, and a bottom interior cooling zone, wherein the iron-containing pellets or lumps travel downwards through the top interior reducing zone, the middle interior transition zone, and the bottom interior cooling zone as the iron-containing pellets or lumps encounter the upward-flowing reducing gas and one or more other gases, wherein the top interior reducing zone is an area above bustle ports of the shaft furnace adapted to contain the iron-containing pellets or lumps during reduction, the bottom interior cooling zone is an area below a cooling gas offtake of the shaft furnace adapted to contain the iron-containing pellets or lumps after reduction during cooling, and the middle interior transition zone is an area between the bustle ports and the cooling gas offtake adapted to thermally isolate the bottom interior cooling zone from the top interior reducing zone; and providing a flow diverter disposed along a centerline of the circumferential outer wall comprising a convex-upwards upper tapering section disposed in the middle transition zone below the top reducing zone defined by the circumferential outer wall coupled to a convex-downwards lower tapering section disposed in the bottom cooling zone defined by the circumferential outer wall.

12. The method of claim 11, wherein the flow diverter is coupled to a shaft disposed across an interior diameter of the circumferential outer wall.

13. The method of claim 12, wherein the shaft permits the flow diverter to pivot within the interior of the circumferential outer wall.

14. The method of claim 12, wherein the shaft is disposed across the interior diameter of the circumferential outer wall coincident with a boundary between the middle interior transition zone defined by the circumferential outer wall and the bottom interior cooling zone defined by the circumferential outer wall.

15. The method of claim 11, wherein each of the tapering sections of the flow diverter comprises a plurality of segments each having a different taper angle.

16. The method of claim 11, further comprising providing one or more gas ports disposed on one or more of the shaft and the flow diverter configured to communicate a gas into the iron-containing pellets or lumps disposed within the interior of the circumferential outer wall.

17. The method of claim 11, further comprising providing one or more gas ports disposed through the circumferential outer wall below the flow diverter configured to communicate a gas into the iron-containing pellets or lumps disposed within the interior of the circumferential outer wall.

18. The method of claim 11, further comprising providing one or more burden feeders disposed within the circumferential outer wall one or more of above and below the flow diverter.

19. The method of claim 12, further comprising providing a cooling line running through an interior of one or more of the shaft and the flow diverter.

20. The method of claim 11, wherein the lower tapering section of the flow diverter disposed in the bottom cooling zone defined by the circumferential outer wall covers 30% or more of the vertical length of the bottom cooling zone defined by the circumferential outer wall.

* * * * *